(12) United States Patent
Metzger et al.

(10) Patent No.: US 11,339,745 B1
(45) Date of Patent: May 24, 2022

(54) DUAL FLOWPATH EXHAUST FOR FUEL COOLING IN A HYPERSONIC PROPULSION SYSTEM

(71) Applicant: Rolls-Royce North American Technologies Inc., Indianapolis, IN (US)

(72) Inventors: Nicholas Metzger, Fishers, IN (US); Todd S. Taylor, Bargersville, IN (US); Kenneth M. Pesyna, Carmel, IN (US); Timothy Roesler, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 348 days.

(21) Appl. No.: 16/785,056

(22) Filed: Feb. 7, 2020

(51) Int. Cl.
| | | |
|---|---|---|
| *F02K 1/82* | (2006.01) |
| *F02K 7/16* | (2006.01) |
| *F02C 7/224* | (2006.01) |
| *B64D 33/04* | (2006.01) |
| *F02K 1/06* | (2006.01) |
| *F02C 7/04* | (2006.01) |

(52) U.S. Cl.
CPC .............. *F02K 1/822* (2013.01); *B64D 33/04* (2013.01); *F02C 7/04* (2013.01); *F02K 1/06* (2013.01); *F02C 7/224* (2013.01); *F02K 7/16* (2013.01)

(58) Field of Classification Search
CPC . F02K 1/822; F02K 7/16; F02K 1/825; F02C 7/04; F02C 7/224; B64D 33/04
See application file for complete search history.

(56) References Cited

U.S. PATENT DOCUMENTS

| | | | |
|---|---|---|---|
| 5,284,014 A * | 2/1994 | Brassier ................... | F02K 7/16 60/225 |
| 5,694,768 A | 12/1997 | Johnson et al. | |
| 7,140,174 B2 * | 11/2006 | Johnson ................... | F02K 7/16 60/262 |
| 7,762,077 B2 | 7/2010 | Pederson et al. | |
| 8,356,483 B2 | 1/2013 | Petty et al. | |
| 8,387,367 B2 * | 3/2013 | Houel ................ | B01D 53/9495 60/303 |
| 8,701,379 B2 | 4/2014 | Bulman | |
| 9,109,539 B2 | 8/2015 | Duge et al. | |
| 9,856,824 B2 | 1/2018 | Lerg et al. | |
| 10,094,336 B2 | 10/2018 | Makowski et al. | |
| 10,309,318 B2 | 6/2019 | Ruberte Sanchez | |
| 2005/0235629 A1 * | 10/2005 | Cuva ........................ | F02K 7/10 60/266 |
| 2008/0283677 A1 * | 11/2008 | Pederson .................. | F02K 7/14 60/225 |
| 2015/0300260 A1 * | 10/2015 | Wollenweber ............ | F02C 9/40 60/39.12 |
| 2018/0142956 A1 * | 5/2018 | Freund ...................... | F28F 1/12 |

* cited by examiner

*Primary Examiner* — Todd E Manahan
*Assistant Examiner* — Rodolphe Andre Chabreyrie
(74) *Attorney, Agent, or Firm* — Barnes & Thornburg LLP

(57) ABSTRACT

A dual flow path exhaust assembly for use with a combined turbofan and ramjet engine includes a turbofan engine exhaust duct, a ramjet engine exhaust duct, a combined outlet, and door configured to move between an open position and a closed position to selectively isolate the turbofan engine exhaust duct from the combined outlet.

20 Claims, 14 Drawing Sheets

DUAL FLOWPATH EXHAUST FOR FUEL COOLING IN A HYPERSONIC PROPULSION SYSTEM

FIELD OF THE DISCLOSURE

The present disclosure relates generally to propulsion systems including gas turbine engines and ramjet engines, and more specifically to pressure equalization and component cooling in a dual flow path exhaust of a hypersonic propulsion system.

BACKGROUND

Gas turbine engines are used to propel aircraft and the like at relatively low speeds, including subsonic speeds and some supersonic speeds, for example, speeds up to about Mach 2.5. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Ramjet engines are used to propel aircraft and the like at relatively high speeds, including supersonic and hypersonic speeds, for example, speeds of Mach 2.5 and greater. A ramjet engine uses the engine's forward motion to compress incoming air without the use of a mechanical compressor. Because a ramjet engine relies on the engine's forward motion to compress incoming air, a ramjet-powered aircraft may use another means of propulsion such as a gas turbine engine to accelerate the aircraft from a standstill to a speed at which the ramjet engine becomes operable.

A gas turbine engine may be combined with a ramjet engine in a single engine housing or nacelle for use with an aircraft. The gas turbine engine may be operated while the ramjet engine is inoperable in order to accelerate the aircraft from standstill to a speed at which the ramjet engine becomes operable. Once the aircraft has been accelerated to a speed at which the ramjet is operable, the ramjet engine may then be placed into operation to propel the aircraft at high speeds and the gas turbine engine may be taken out of operation.

Such a gas turbine and ramjet engine combination may include a housing defining a gas turbine engine exhaust duct receiving exhaust from the gas turbine engine, a ramjet exhaust duct receiving exhaust from the ramjet engine, and a combine outlet receiving exhaust from the gas turbine engine exhaust duct and the ramjet engine exhaust duct. The housing may include a door that selectively blocks the gas turbine engine exhaust duct from the exhaust nozzle when the ramjet is in operation and the gas turbine engine is not in operation. Such a door, however, may be difficult to operate due to pressure differential on opposite sides of the door. Also, the gas turbine engine exhaust duct, the ramjet exhaust duct, the combined outlet, and the door are subject to extreme heat, but are difficult to cool.

SUMMARY

The present disclosure may comprise one or more of the following features and combinations thereof.

A cooling system for use in a dual flow path exhaust assembly for a combined turbofan and ramjet engine that includes a turbofan engine configured to provide a first stream of pressurized exhaust and a ramjet engine configured to provide a second stream of pressurized exhaust. The cooling system including a housing, a door, and an overlay. The housing may include a turbofan engine exhaust duct, a ramjet engine exhaust duct, and a combined outlet. The turbofan engine exhaust duct defines a first flow path configured to convey the first stream of pressurized exhaust therethrough. The ramjet engine exhaust duct defines a second flow path configured to convey the second stream of pressurized exhaust therethrough. The combined outlet defines a combined flow path.

The combined outlet is defined by a confluence of an aft end of the turbine engine exhaust duct and an aft end of the ramjet engine exhaust duct. The combined outlet is in fluid communication with the ramjet engine exhaust duct and in selective fluid communication with the turbofan engine exhaust duct. The combined outlet is configured to receive the second stream of pressurized exhaust therethrough and to selectively receive and convey the first stream of pressurized exhaust therethrough. The door is configured to selectively block the turbofan engine exhaust duct from the ramjet engine exhaust duct and the combined outlet. The overlay is coupled to at least one of an inner surface of one of the turbofan engine exhaust duct, the ramjet engine exhaust duct, the combined outlet, and the door.

The overlay includes a skin and a heat exchanger. The skin is configured to further define a corresponding one of the first flow path, the second flow path, and the combined flow path. The skin is configured to enable smooth flow of the corresponding one of the first stream of pressurized exhaust and the second stream of pressurized exhaust thereacross. The heat exchanger is coupled to the skin. The heat exchanger includes a plurality of cooling channels extending therethrough. Each of the plurality of cooling channels is configured to receive the liquid coolant at an inlet end thereof from a source of liquid coolant and to return the liquid coolant from an outlet end thereof to a liquid coolant receiver.

In some embodiments, the cooling system may include the source of liquid coolant, the liquid coolant receiver, a first conduit coupling the source of liquid coolant to the inlet ends of the cooling channels, and a second conduit. The second conduit may couple the outlet ends of the cooling channels to the liquid coolant receiver.

In some embodiments, the source of liquid coolant may include a fuel tank of an aircraft in which the cooling system is installed. In some embodiments, the liquid coolant includes fuel that is to be used for combustion in one of the turbofan engine and the ramjet engine.

In some embodiments, the cooling system may include a second overlay. The second overlay may be coupled to an inner surface of a second one of the turbofan engine exhaust duct, the ramjet engine exhaust duct, the combined outlet, and the door.

In some embodiments, the overlay may be coupled to the door. The door may be pivotably coupled to the housing by a pivot and the pivot comprises an internal fluid passage configured to convey the liquid coolant therethrough.

In some embodiments, the overlay may be coupled to the one of the turbofan engine exhaust duct, the ramjet engine exhaust duct, the combined outlet, and the door in a manner that allows differential thermal growth of the overlay and the one of the turbofan engine exhaust duct, the ramjet engine exhaust duct, the combined outlet, and the door. In some embodiments, the overlay may be pinned to the one of the turbofan engine exhaust duct, the ramjet engine exhaust duct, the combined outlet, and the door in a manner that allows differential thermal growth of the overlay and the one of the turbofan engine exhaust duct, the ramjet engine exhaust duct, the combined outlet, and the door.

In some embodiments, the skin may be made of a ceramic material. The heat exchanger may be made of a metal material.

According to another aspect of the present disclosure, a cooling system for use in a dual flow path exhaust assembly for a combined turbofan and ramjet engine that includes a turbofan engine configured to provide a first stream of pressurized exhaust and a ramjet engine configured to provide a second stream of pressurized exhaust. The cooling system further includes a housing, a door, and an overlay. The housing includes a first exhaust duct configured to convey a first stream of pressurized exhaust therethrough, a second exhaust duct configured to convey the second stream of pressurized exhaust therethrough, and a combined outlet configured to convey a combined stream of pressurized exhaust therethrough. The combined stream of pressurized exhaust comprising the first stream of pressurized exhaust and the second stream of pressurized exhaust. The door is configured to selectively block the first exhaust duct from the second exhaust duct and the combined outlet.

The overlay is coupled to an inner surface of one of the first exhaust duct, the second exhaust duct, the combined outlet, and the door. The overlay includes a skin and a heat exchanger. The skin defines a corresponding one of a first flow path conveying the first stream of pressurized exhaust, a second flow path conveying the second stream of pressurized exhaust, and a combined flow path conveying the first stream of pressurized exhaust and the second stream of pressurized exhaust. The heat exchanger is coupled to the skin. The heat exchanger includes a plurality of cooling channels extending therethrough. Each of the plurality of cooling channels is configured to receive a liquid coolant at an inlet end thereof from a source of liquid coolant and to return the liquid coolant from an outlet end thereof to a liquid coolant receiver.

In some embodiments, the cooling system may include the source of liquid coolant, the liquid coolant receiver, a first conduit coupling the source of liquid coolant to the inlet ends of the cooling channels, and a second conduit. The second conduit may couple the outlet ends of the cooling channels to the liquid coolant receiver.

In some embodiments, the source of liquid coolant may include a fuel tank of an aircraft in which the cooling system is installed. In some embodiments, the liquid coolant may include fuel intended for combustion in one of the turbofan engine and the ramjet engine.

In some embodiments, the cooling system includes a second overlay. The second overlay may be coupled to an inner surface of a second one of the first exhaust duct, the second exhaust duct, the combined outlet, and the door.

In some embodiments, the overlay may be coupled to the door. The door may be pivotably coupled to the housing by a pivot. The pivot may include an internal fluid passage configured to convey the liquid coolant therethrough.

In some embodiments, the overlay may be coupled to the one of the first exhaust duct, the second exhaust duct, the combined outlet, and the door in a manner that allows differential thermal growth of the overlay with respect to the one of the first exhaust duct, the second exhaust duct, the combined outlet, and the door. In some embodiments, the overlay may be pinned to the one of the turbofan engine exhaust duct, the ramjet engine exhaust duct, the combined outlet, and the door in a manner that allows differential thermal growth of the overlay with respect to the one of the turbofan engine exhaust duct, the ramjet engine exhaust duct, the combined outlet, and the door. In some embodiments, the skin may be made of a ceramic material and the heat exchanger is made of a metal material.

According to another aspect of the present disclosure, a method for cooling a surface defining an exhaust duct of a combined turbofan engine and ramjet engine of an aircraft may include a number of steps. The method may include providing a dual flow path exhaust assembly for an aircraft including a first exhaust duct, a second exhaust duct, a combined outlet, and a door configured to selectively block the first exhaust duct from the second exhaust duct and the combined outlet; providing an overlay comprising; a skin defining an inner surface of a corresponding one of the first exhaust duct, the second exhaust duct, the combined outlet, and the door; and a heat exchanger coupled to the skin, the heat exchanger comprising a plurality of cooling channels extending therethrough, each of the plurality of cooling channels configured to convey a liquid coolant therethrough, providing a source of liquid coolant; and conveying the liquid coolant through the plurality of cooling channels.

In some embodiments, the source of liquid coolant may include a fuel tank. The liquid coolant may include fuel for combustion in engine of the aircraft.

These and other features of the present disclosure will become more apparent from the following description of the illustrative embodiments.

DETAILED DESCRIPTION OF THE DRAWINGS

Figure 1A:
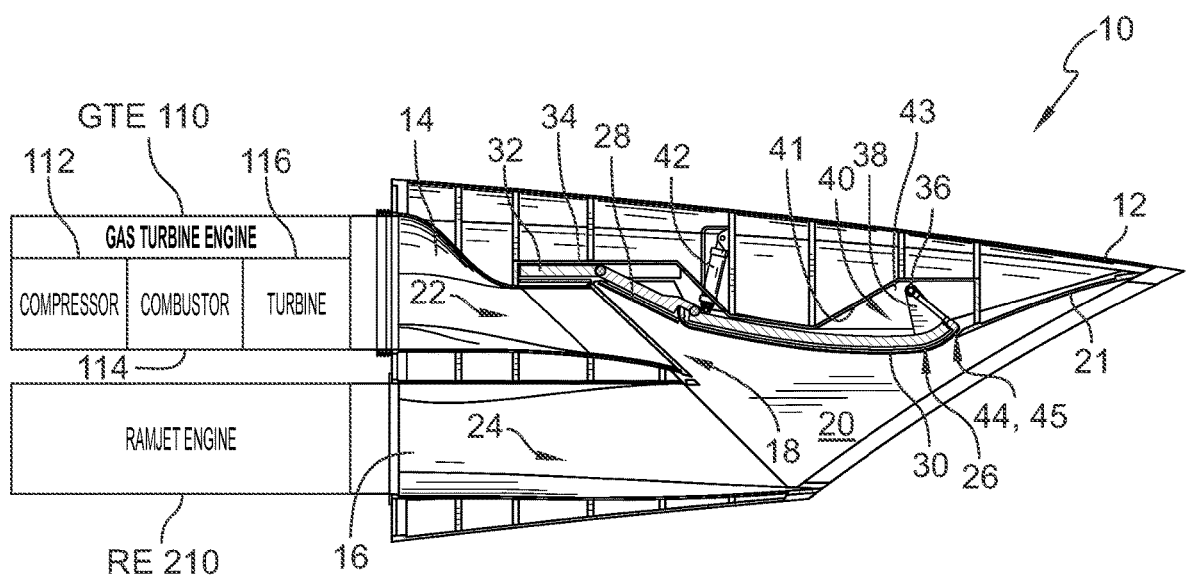
FIG. 1A is a diagrammatic and cross-sectional side elevation view of a dual flow path exhaust assembly of a combined turbofan and ramjet engine according to the present disclosure, the assembly including a housing defining a turbofan engine exhaust duct and a corresponding a first flow path, a ramjet exhaust duct and a corresponding second flow path, a combined outlet defined by the convergence of the turbofan engine exhaust duct and the ramjet exhaust duct, and a door configured to move between a plurality of positions to vary a throat of the nozzle and to selectively block the turbofan engine exhaust duct from the ramjet exhaust duct and the combined outlet and showing the door in a fully open position.

For the purposes of promoting an understanding of the principles of the disclosure, reference will now be made to a number of illustrative embodiments shown in the drawings and specific language will be used to describe the same.

The drawings show illustrative embodiments of a dual flow path exhaust assembly 10 for use with a combined turbofan and ramjet engine including a turbofan engine 110 configured to provide a first stream of pressurized exhaust and a ramjet engine 210 configured to provide a second stream of pressurized exhaust.

As shown in FIGS. 1A-5B, an illustrative embodiment of the assembly 10 includes a housing 12 containing a first exhaust duct (which may be referred to herein as a turbofan engine exhaust duct) 14, a second exhaust duct (which may be referred to herein as a ramjet engine exhaust duct) 16, a port 18 at the confluence of the first exhaust duct 14 and the second exhaust 16 duct, and a combined outlet 20 aft of the confluence of the first exhaust duct 14 and the second exhaust 16 duct. The first exhaust duct 14 defines a first flow path 22 configured to convey the first stream of pressurized exhaust from a turbofan engine 110 or other gas turbine engine GTE 110 to the combined outlet 20. Similarly, the second exhaust duct 16 defines a second flow path 24 configured to convey the second stream of pressurized exhaust from a ramjet engine RE 210 to the combined outlet 20. The combined outlet 20 defines a combined flow path configured to convey the first and second streams of pressurized exhaust to the environment outside the housing 12. The port 18 selectively couples the first exhaust duct 14 with the second exhaust duct 16 in fluid communication with each other.

The assembly 10 also includes a door 26 configured to move between open and closed positions to selectively block the port 18, thereby selectively blocking the first exhaust duct 14 from the second exhaust duct 16 and the combined outlet 20 as suggested in FIGS. 1A-3B. The door 26 is configured to move between a plurality of positions, as suggested in FIG. 1C, between the fully opened position, shown in FIG. 1A, and the closed position, shown in FIG. 1B. In particular, FIG. 1C may be a minimum area nozzle position. The plurality of positions allow for the door 26 to vary a throat of the nozzle as suggested in FIG. 1C.

In operation, the area of the throat of the nozzle may be varied to vary ramjet operation on and off. In the fully closed position, shown in FIG. 1B, the door 26 acts as a valve to close the flow path 22 and also acts as an upper wall flow path for the ramjet engine RE 210 exhaust. In some operating conditions when the ramjet engine RE 210 is starting up, both engines GTE 110 and RE 210 are operating at the same time and the door 26 is at least partially open. Once the ramjet engine RE 210 is sufficiently operating, the gas turbine engine GTE 110 may be shut down and the door 26 moved to the closed position shown in FIG. 1B.

The door includes a forward panel 28 and an aft panel 30. The aft end of the forward panel 28 is pivotably coupled to the forward end of the aft panel 30.

The forward end of the forward panel 28 of the door 26 is pivotably coupled to a slider 32 as shown in FIGS. 1A-2B. The slider 32 is slidingly engaged with corresponding tracks 34 connected to the housing 12. The slider 32 and the tracks 34 are configured so that the slider 32 and, therefore, the forward end of the forward panel 28 of the door 26, may move in a fore and aft direction with respect to the housing 12 when the door 26 is moved between the open and closed positions, as will be discussed further below.

The aft end of the aft panel 30 of the door 26 is coupled to the housing 12 via pivots 36 so that the aft panel 30 may pivot with respect to the housing 12 as shown in FIGS. 1A-2B. The pivots 36 are located at distal ends of pivot arms 38 extending from a surface of the aft panel 30 of the door 26 facing outwardly away from the second duct 16 in a direction perpendicular to the surface of the aft panel 30. The pivots 36 are located forward of the aft end of the aft panel 30 of the door 26. The location of the pivots 36 with respect to the housing 12 and aft panel 30 of the door 26 provides that the aft end of the aft panel 30 of the door 26 travels through an arc when the aft panel 30 of the door 26 is pivoted with respect to the housing 12.

Figure 1B:
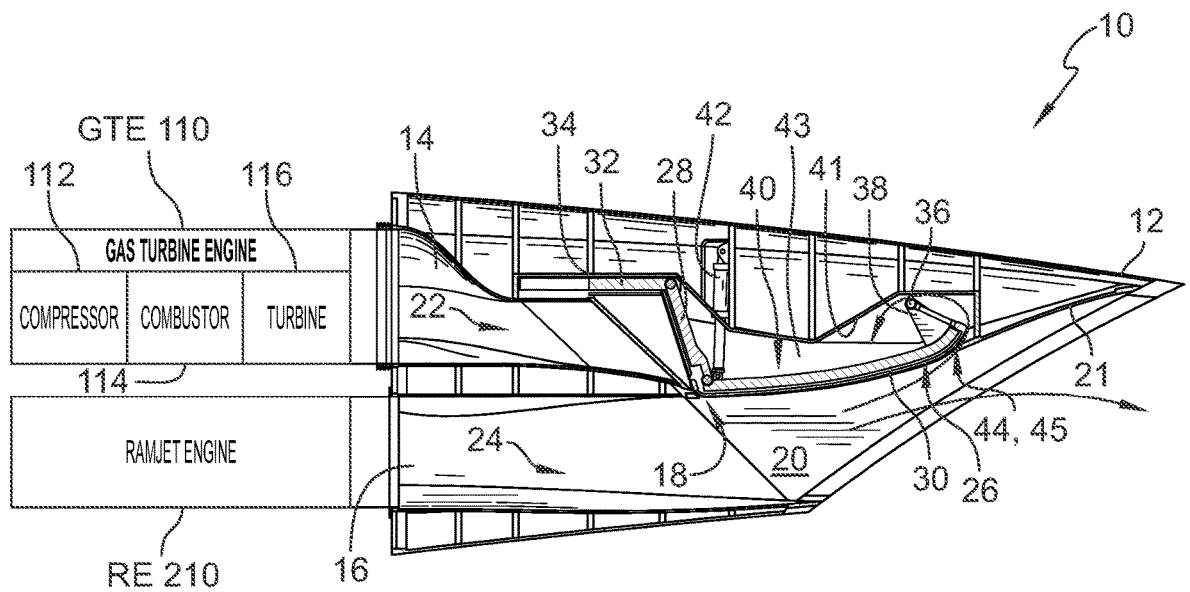
FIG. 1B is a diagrammatic and cross-sectional side elevation view of the dual flow path exhaust assembly of FIG. 1A showing the door in the closed position in response to the combined turbofan and ramjet engine acting in a scramjet mode and the door provides an upper wall flow path for the nozzle and suggesting that a portion of the ramjet exhaust is conducted around the door to provide pressure balancing on the door.
Figure 1C:
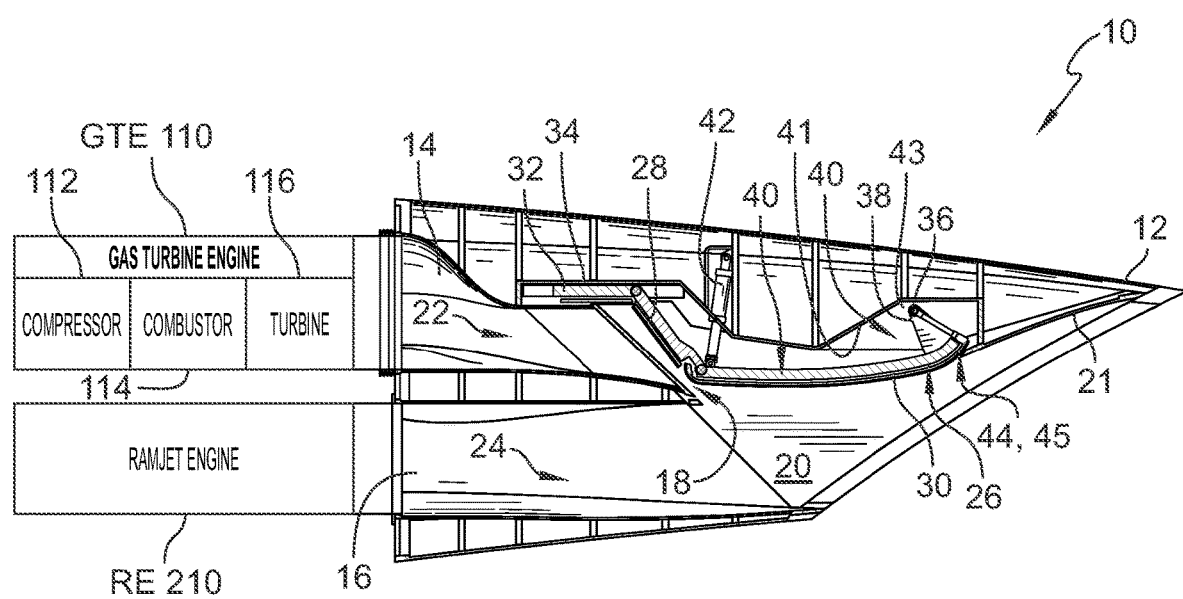
FIG. 1C is a diagrammatic and cross-sectional side elevation view of the dual flow path exhaust assembly of FIG. 1A showing the door in a partially open position between the fully open position and the closed position to vary the flow path and flow rate of the gas turbine engine.
Figure 2A:
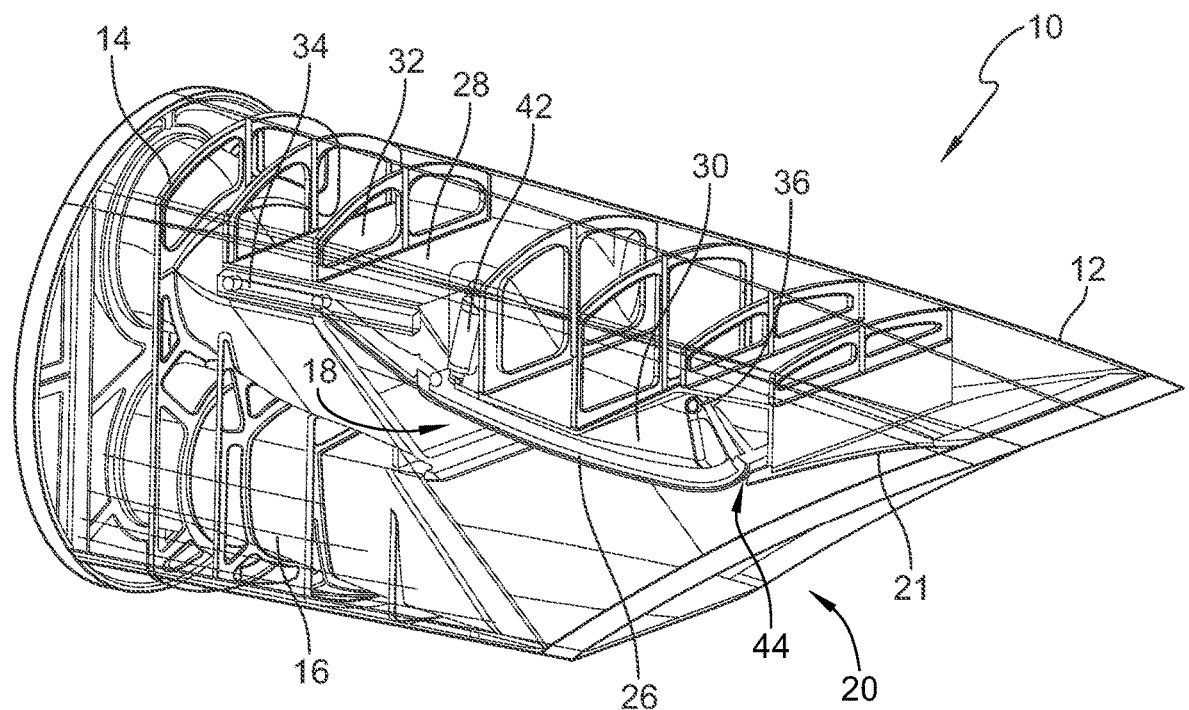
FIG. 2A is a rear perspective view of the assembly of FIG. 1A with a portions of the housing cut away and other portions shown in transparent to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in an open position, thereby enabling flow through the turbofan engine exhaust duct to the combined outlet.
Figure 2B:
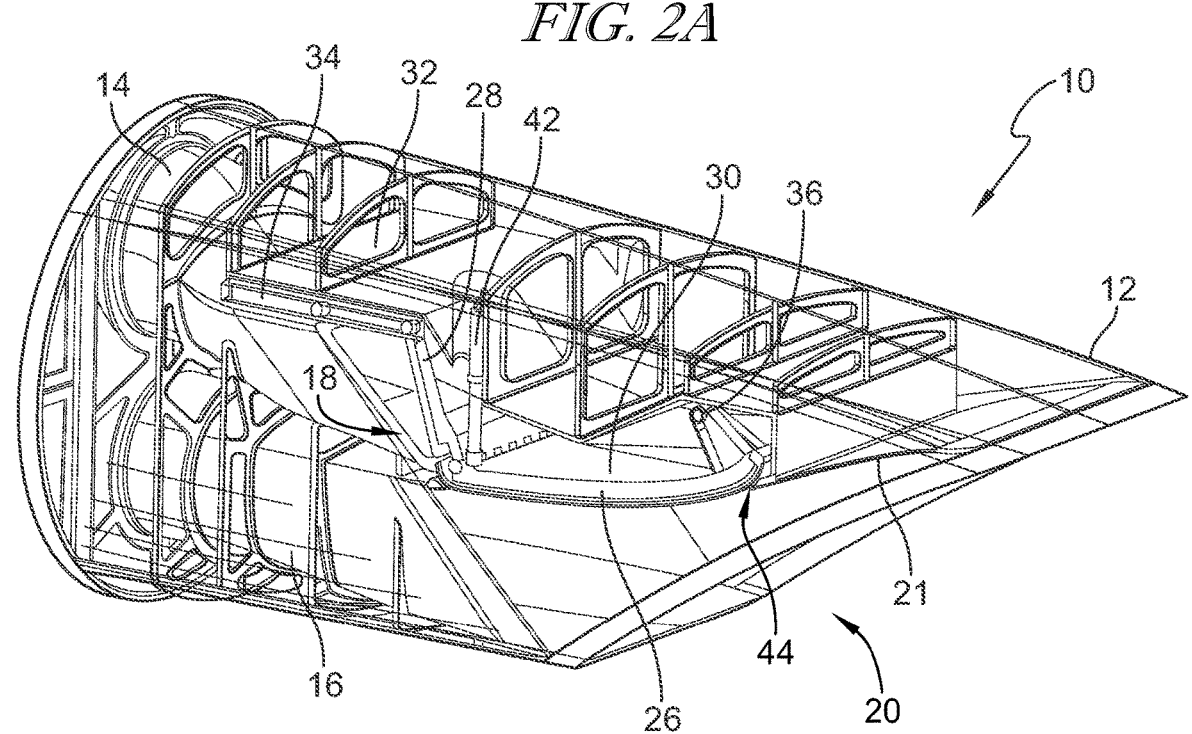
FIG. 2B is a rear perspective view of the assembly of FIG. 1B with portions of the housing cut away and other portions shown in transparent to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in a closed position, thereby blocking flow through the turbofan engine exhaust duct to the combined outlet.

A cavity 40 is located on a side of the door 26 facing outwardly away from the second duct 16 as shown in FIGS. 1A and 1B. The cavity 40 has a first volume when the door 26 is in the open position and a second volume different than the first volume when the door 26 is in the closed position. In the illustrated embodiment, the second volume is greater than the first volume. The cavity 40 is defined at least in party by the forward panel 28, the aft panel 30, a top wall 41, and side walls 43 of the ducting.

Figure 3A:
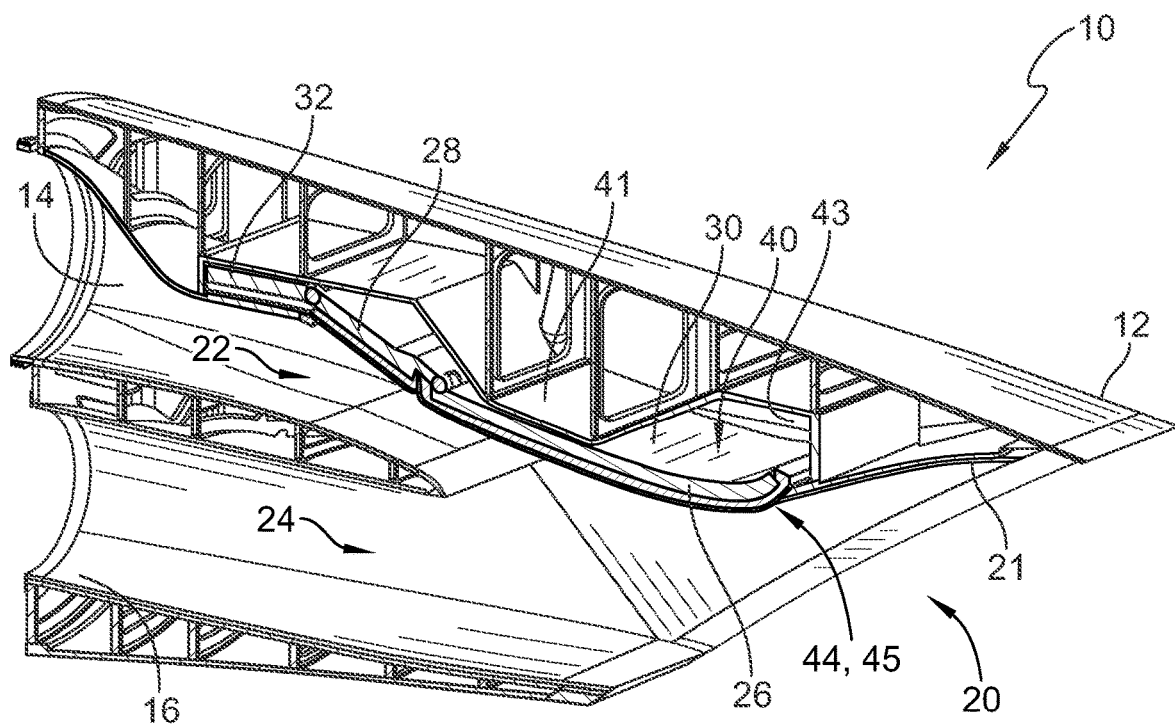
FIG. 3A is a rear perspective view of the assembly of FIG. 1A with a further portion of the housing cut away to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the open position, thereby enabling flow through the turbofan engine exhaust duct to the combined outlet.
Figure 3B:
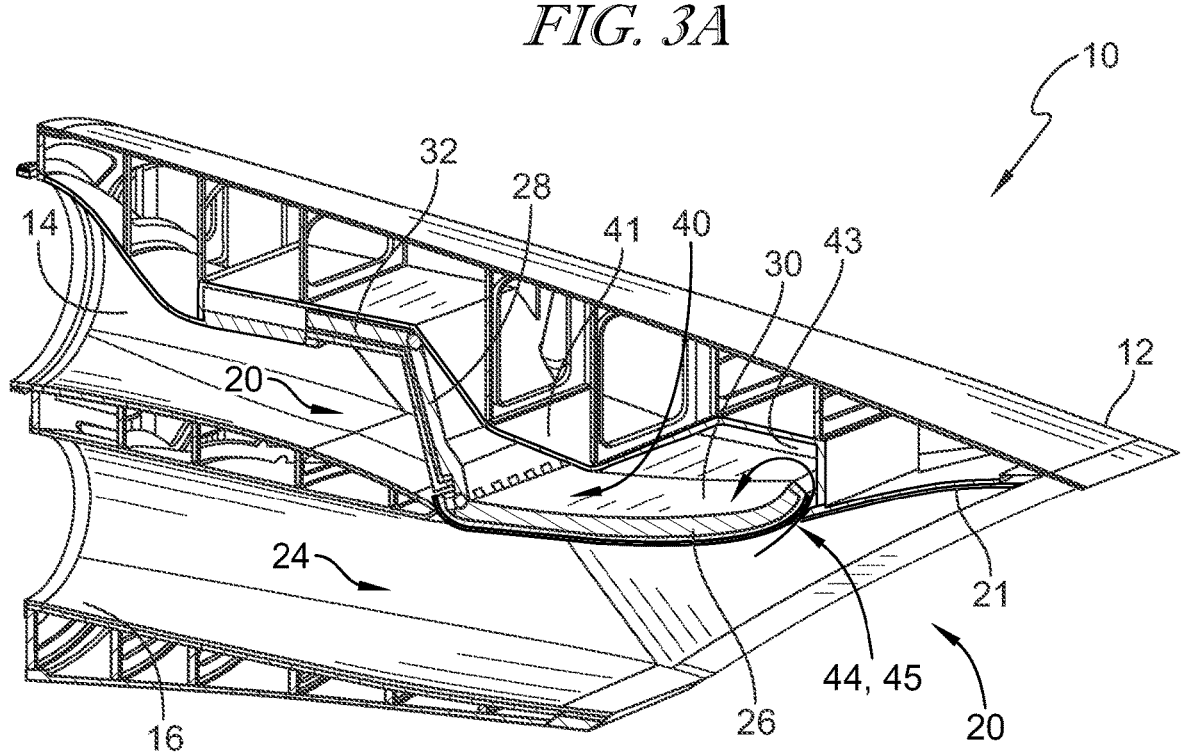
FIG. 3B is a rear perspective view of the assembly of FIG. 1B with a further portion of the housing cut away to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the closed position, thereby blocking flow through the turbofan engine exhaust duct to the combined outlet.

As best shown in FIGS. 3A and 3B, each of the first exhaust duct 14, the second exhaust duct 16, and the combined duct 20 includes a corresponding inner wall having a surface defining at least a portion of the corresponding first flow path 22, second flow path 24, and combined flow path. As best shown in FIGS. 1A-5B, an inner surface of the aft panel 30 of the door 26 facing away from the cavity 40 defines a portion of the first flow path 22 and a portion of the combined flow path when the door 26 is in the open position. The inner surface of the aft panel 30 of the aft panel of the door 26 facing away from the cavity 40 defines a portion of the second flow path 24 when the door 26 is in the closed position. The foregoing wall and door surfaces are smooth and continuous to enable efficient flow of the first, second, and combined streams of pressurized exhaust therethrough. The foregoing wall and door surfaces may be embodied as surfaces of a thermal protection and cooling system, as will discussed further below The assembly 10 further includes one or more actuators 42 (two actuators 42 are shown) configured to move the door 26 between the open position and the closed position as shown in FIGS. 1A and 1B. As suggested in FIG. 1C, the door 26 may also be held in any of the plurality of positions between the fully open and the closed position. In the illustrated embodiment, the actuator 42 is a linear actuator having a first end coupled to the housing 12 and a second end coupled to the door 26 proximate the pivotable coupling of the forward panel 28 of the door 26 with the aft panel 30 of the door 23. More specifically, the second end of the actuator 42 is coupled to a forward portion of the aft panel 30 of the door 26 proximate the aft end of the forward panel 28 of the door 26. As shown, the actuator 42 is configured to exert a force on the aft panel 30 of the door in a direction generally perpendicular to the first and second flow paths 22, 24.

During operation of a combined turbofan and ramjet engine in which the assembly 10 may be installed, pressure in one or more of the first exhaust duct 14, the second exhaust duct 16, and the combined outlet 20 may be significantly greater than the pressure in the cavity 40. Under such conditions and without the use of the features of the present disclosure, significant force may be used to move the door 26 from the open position to the closed position to overcome the pressure differential on opposite sides of the door 26. Additionally, significant force may be used to maintain the door 26 in the closed position.

In order to lessen the force required to move the door 26 from the open position to the closed position and maintain the door 26 in the closed position during operation of the combined turbofan and ramjet engine, a pressure equalization passage 44 is provided by the present disclosure between the cavity 40 and the opposite side of the door 26 as shown in FIGS. 1A-3B. The cavity 40 is generally sealed other than the gap 44 so that hot exhaust gas is contained in the cavity 40. In some embodiments, a leakage path other than the gap 44 may be provided to allow a controlled flow of the fluid into the cavity through the gap 44 and out of the cavity through the other leakage path.

Figure 4:
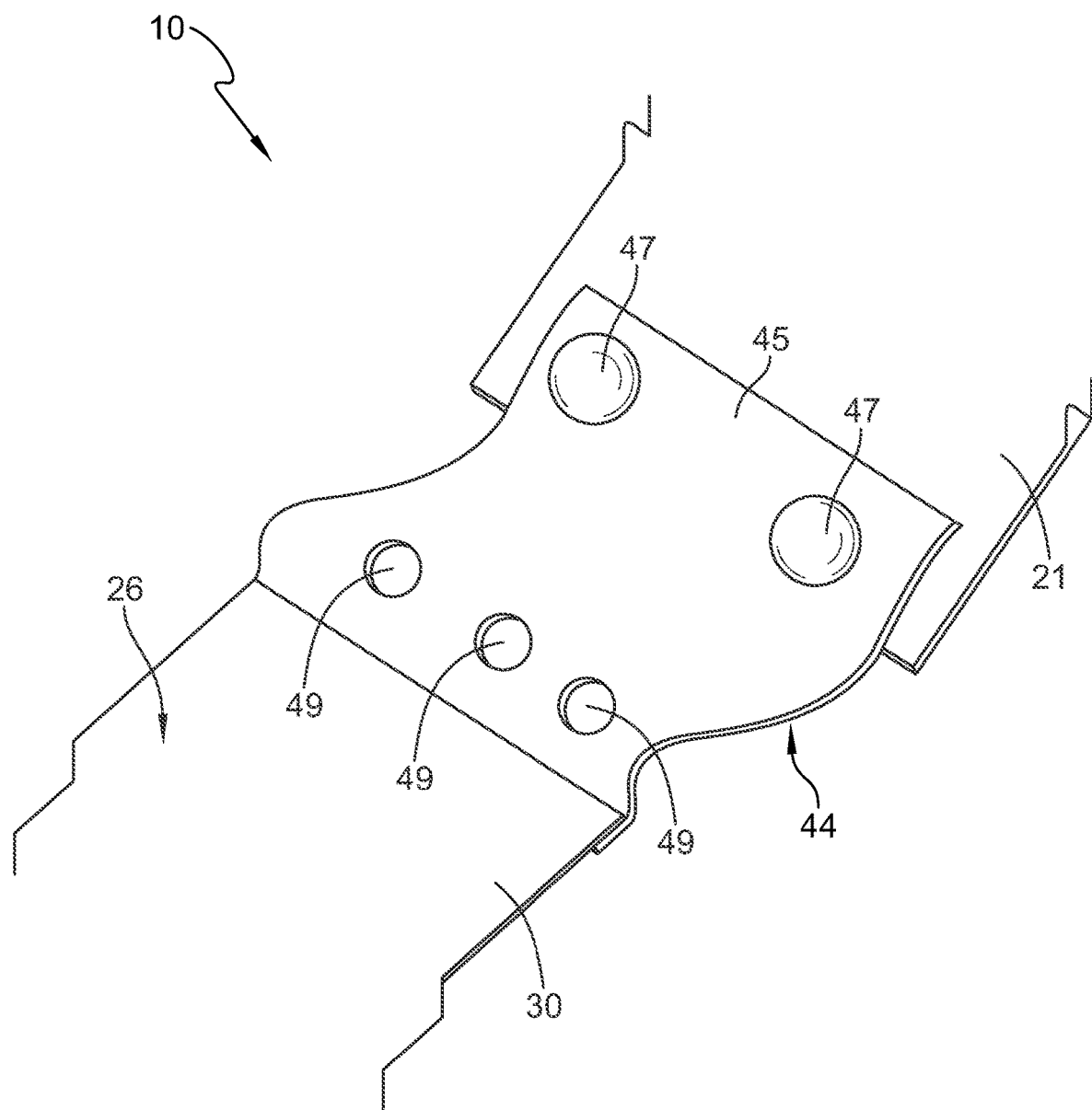
FIG. 4 is a perspective view of a seal plate coupled to a wall of the assembly of FIG. 1A, and sealingly engaged with the door, the seal plate defining metered hoes therethrough for conducting a predetermined amount of fluid through the holes and onto a backside of the door to help pressure balance the door.
Figure 5A:
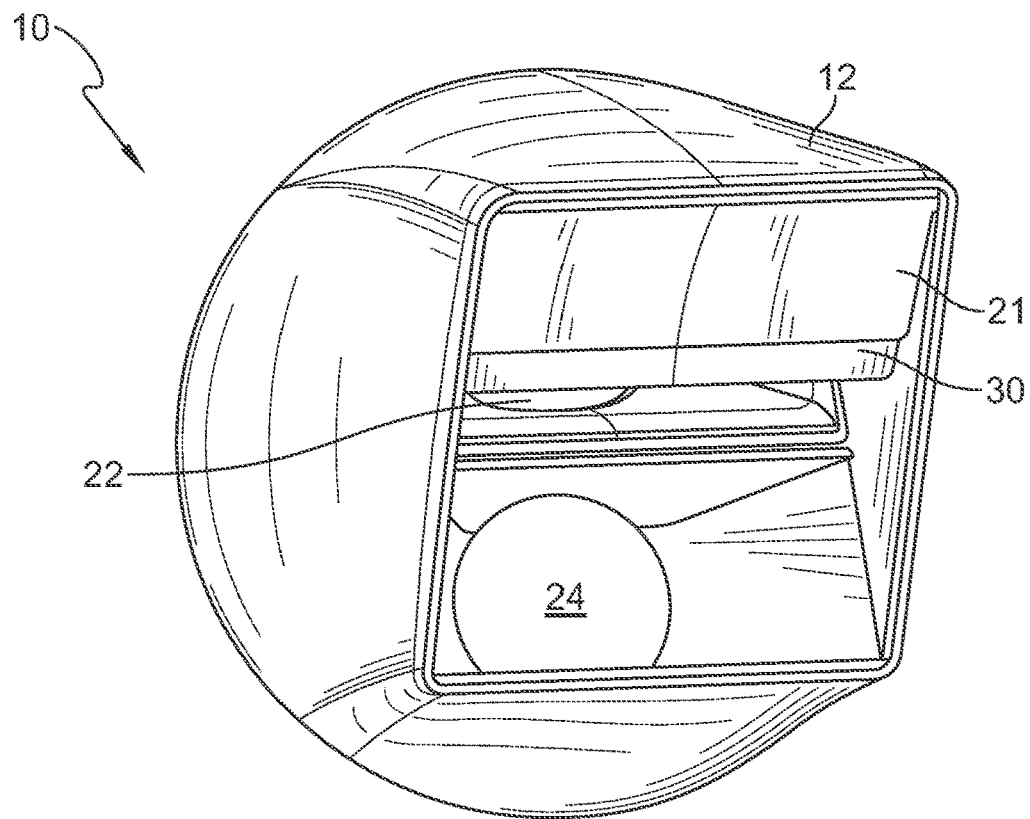
FIG. 5A is a rear perspective view of the assembly of FIG. 1A showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the open position, thereby enabling flow through the turbofan engine exhaust duct to the combined outlet.
Figure 5B:
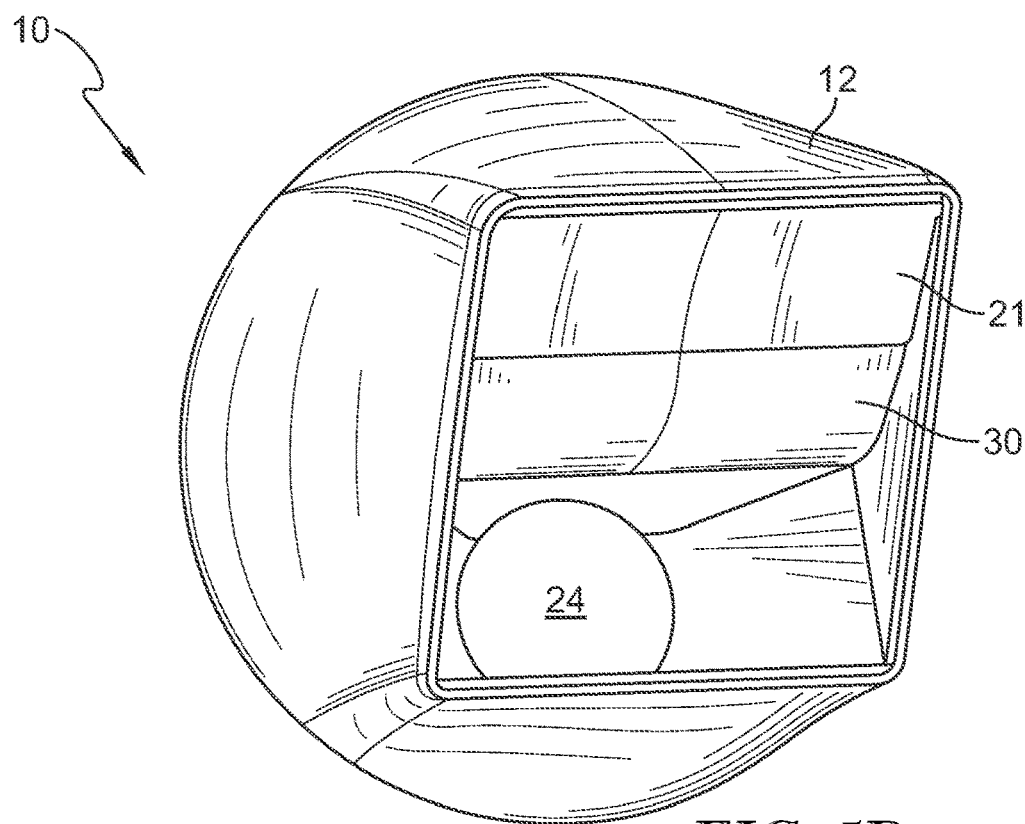
FIG. 5B is a rear perspective view of the assembly of FIG. 1B showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the closed position, thereby blocking flow through the turbofan engine exhaust duct to the combined outlet.

As best shown in FIGS. 3A-4, the pressure equalization passage may be embodied as a gap 44 between the inner surface of the aft end of the aft panel 30 of the door 26 and a corresponding portion of an inner surface of a fixed wall 21 defining a portion of the combined outlet 20. As shown, the forward edge and the aft edge of the aft panel 30 of the door 26 are upswept toward the cavity 40 and outwardly away from the second exhaust duct 16. The upswept forward edge of the aft panel 30 of the door 26 defines an arc that cooperates with the aft edge of the forward panel 28 of the door 26 so as to maintain a substantially constant distance therebetween as the door 26 is moved between the open and closed positions.

The upswept aft edge of the aft panel 30 of the door 26 defines an arc that parallels the arc through which the aft edge of the aft panel 30 of the door 26 travels when the aft panel 30 of the door 26 is pivoted with respect to the housing 12. As such, the gap 44 between the aft edge of the aft panel 30 of the door 26 and the fixed wall 21 may remain constant as the aft panel 30 of the door 26 is pivoted with respect to the housing 12, as occurs when the door 26 is moved between the open and closed positions. The gap 44 allows pressurized fluid to enter the cavity 40 and apply pressure to the outer side of the panel 30 to help offset the pressure applied to inner side (gas path facing side) of the panel 30.

As mentioned above, at least one of the surface of the door 26 facing away from the cavity and the adjacent surface of the fixed wall 21 may be covered with a thermal protection and cooling overlay, as will be discussed further below. In such embodiments, such overlays may further define the gap 44.

In an embodiment, as shown in FIG. 4, a seal plate 45 is sealingly coupled, for example, using rivets 47 or other coupling means, to one of the aft panel 30 of the door 26 and the fixed wall 21 and sealingly engaged with the other of the aft panel 30 of the door 26 and the fixed wall 21, thereby sealing the gap 44. The components in FIG. 4 are broken away and cutaway to show only a portion of the components. The seal plate 45 defines one or more metered holes 49 therethrough. The metered holes 49 are in fluid communication with the cavity 40 and the opposite side of the door 26, and thereby define the pressure equalization passage. The metered holes 49 have a predetermined size to provide the pressure of the fluid into the cavity 40 while minimizing flow of hot exhaust gases into the cavity 40.

In operation, the exhaust assembly 10 may be configured with the door 26 in the open position as shown in FIGS. 1A, 2A, 3A, and 5A. With the door 26 in the open position, the port 18 is uncovered or exposed, thereby enabling flow of the first stream of pressurized exhaust through the first exhaust duct 14, the port 18, and the combined outlet 20, and thereby enabling operation of the turbofan engine GTE 110 providing the first stream of pressurized exhaust. Also, with the door 26 in the open position, the surface of the door 26 opposite the cavity 40 forms a portion of the first duct 14 and the combined outlet 20.

The door 26 may be moved from the open position to the closed position as shown in FIGS. 1B, 2B, 3B, and 5B by extending the actuators 42, thereby pivoting the aft panel 30 of the door 26 about the pivots 36 so that the aft panel 30 of the door 26 blocks the port 18. As the aft panel 30 of the door 26 pivots, the gap 44 between the aft panel 30 of the door 26 remains constant in the illustrative embodiment. Also, as the aft panel 30 of the door pivots, the aft end of the forward panel 28 of the door 26 is drawn toward the port 18. Consequently, the slider 32 and the forward end of the forward panel 28 of the door 26 are drawn in an aft direction through cooperation of the slider 32 with the track 34. With the door 26 in the closed position, the port 18 is blocked, thereby precluding flow of the first stream of pressurized exhaust through the first exhaust duct 14, the port 18, and the combined outlet 20, and thereby precluding operation of a turbofan engine GTE 110 providing the first stream of pressurized exhaust.

The GTE 110 is shut down when the door 24 is closed in the illustrative embodiment. The GTE 110 includes a compressor 112, a combustor 114, and a turbine 116 in the illustrative embodiment as shown in FIG. 1A. The GTE 110 further includes a turbofan arranged within a shroud. The door 26 may be moved from the closed position to the open position by retracting the actuators 42, thereby reversing the motions and effects described above in connection with opening the door 26.

Figure 6:
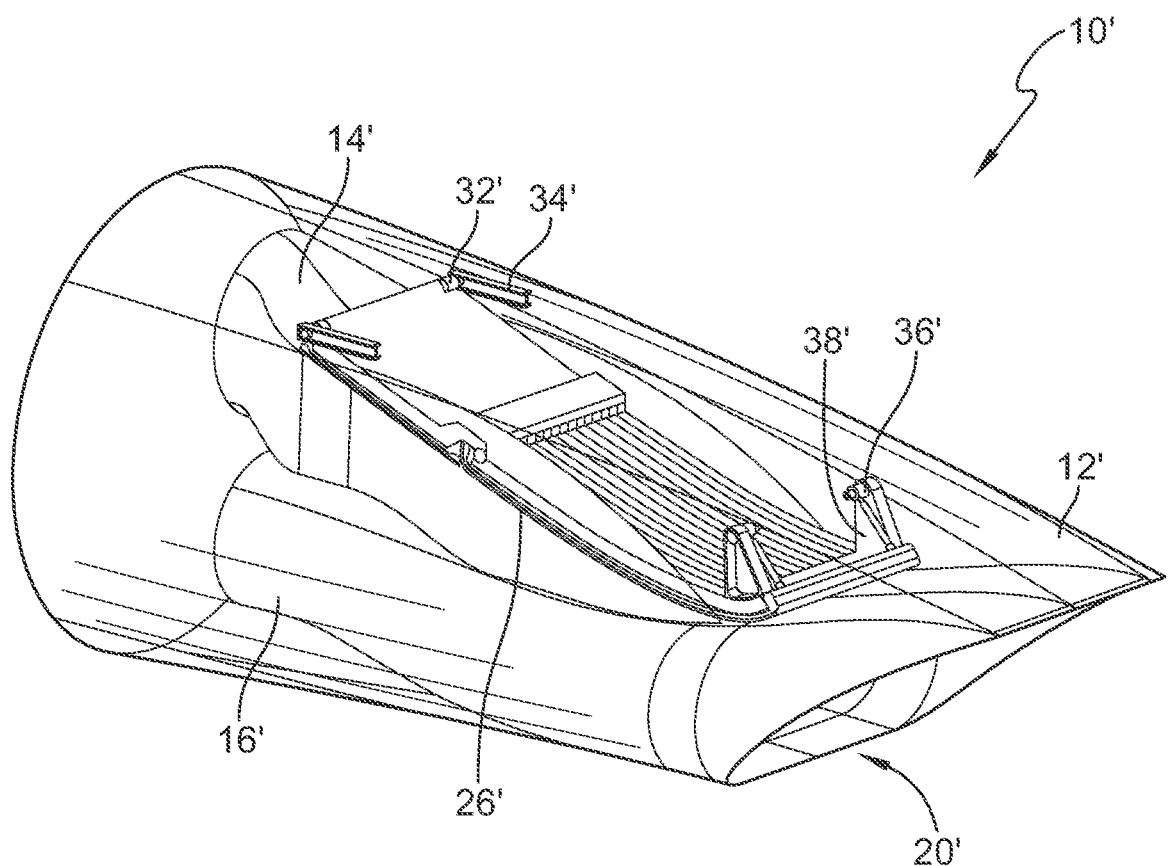
FIG. 6 is a rear perspective view of an alternative embodiment of the of the assembly of FIG. 1A with a portion of the housing in transparent to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in an open position, thereby enabling flow through the turbofan engine exhaust duct to the combined outlet.
Figure 7A:
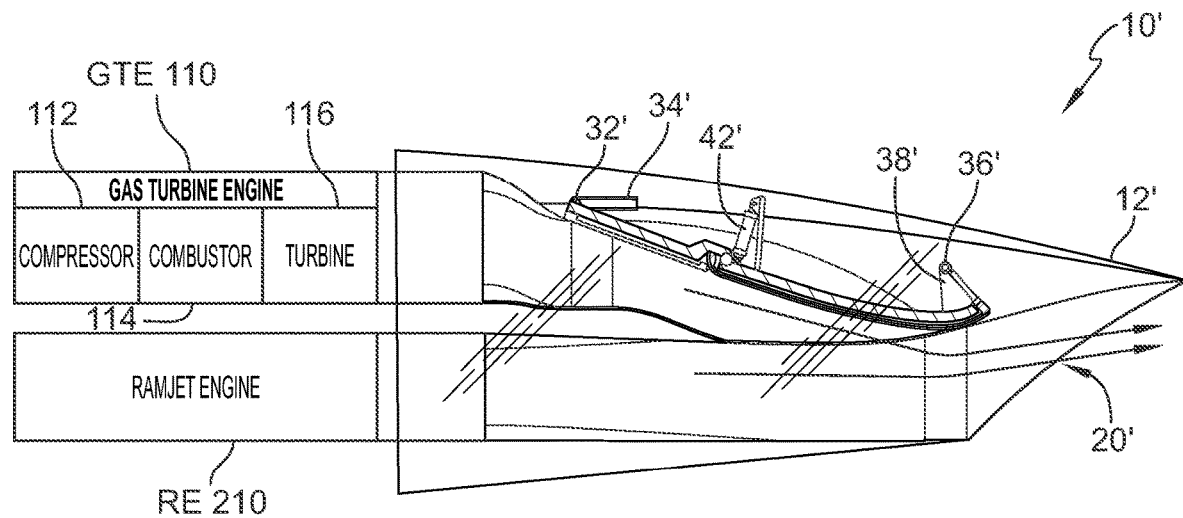
FIG. 7A is a diagrammatic and cross-sectional side elevation view of the assembly of FIG. 6 showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the open position, thereby enabling flow through the turbofan engine exhaust duct to the combined outlet.
Figure 7B:
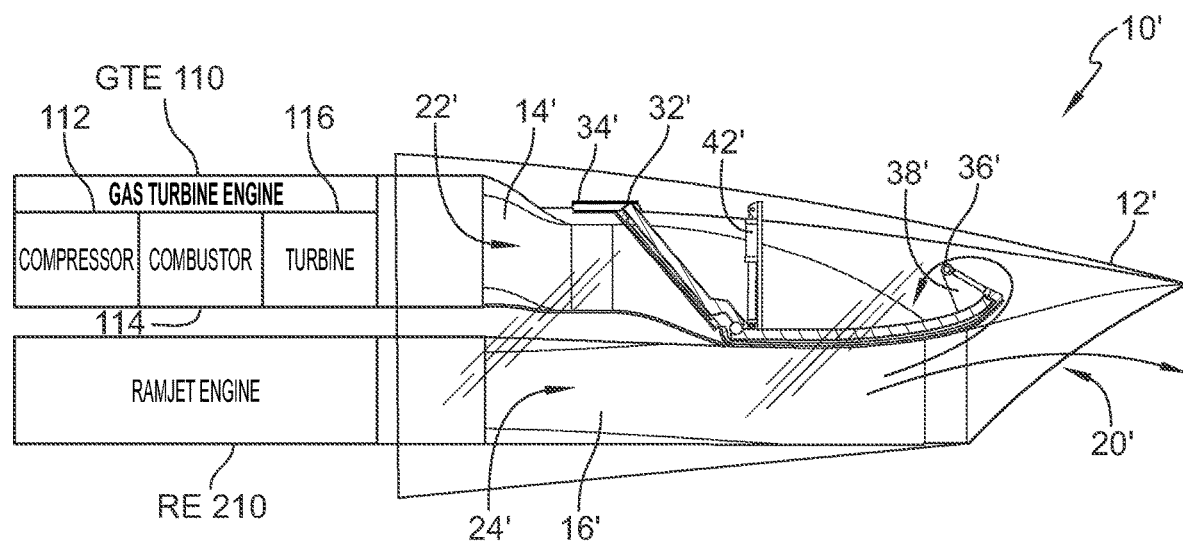
FIG. 7B is a diagrammatic and cross-sectional side elevation view of the assembly of FIG. 6 showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the closed position, thereby blocking flow through the turbofan engine exhaust duct to the combined outlet.

FIGS. 6-7B show an alternative embodiment of a dual flow path exhaust assembly 10' according to the present disclosure. The assembly 10' is substantially similar to the assembly 10. The assembly 10' differs from the assembly 10 primarily in the manner in which the forward panel 28' of the door 26 is coupled to the housing 12'.

More specifically, whereas the forward end of the forward panel 28 of the door 26 of the assembly is pivotably coupled to the slider 32, the forward end of the forward panel 28' of the door 26' is instead coupled to track engaging members 32' at opposite sides of the forward end of the forward panel 28'. The track engaging members 32' are engaged with corresponding tracks 34' coupled to the housing 12'. The track engaging members 32' slide in the tracks 34'. The track engaging members 32' and the tracks 34' are configured so that the track engaging members 32' and, therefore, the forward end of the forward panel 28' of the door 26, may move in a fore and aft direction with respect to the housing 12'. The track engaging members 32' may be embodied as sliders, rollers, or other suitable structures.

As suggested above, operation of the assembly 10 may subject the first exhaust duct 14, the second exhaust duct 16, the combined outlet 20, and the door 26 to extremely high temperatures, which may be detrimental to the structural integrity of the first exhaust duct 14, the second exhaust duct 16, the combined outlet 20, and the door 26. Accordingly, as mentioned above, any or all of the inner walls of the first exhaust duct 14, the second exhaust duct 16, the combined outlet 20, and the inner surface of the door 26 opposite the cavity 40 may be covered with one or more corresponding thermal protection and cooling overlays 70 configured to protect the foregoing walls and surface from the high temperatures caused by the exhaust gases flowing through the first exhaust duct 14, the second exhaust duct 16, and the combined outlet 20.

Figure 8:
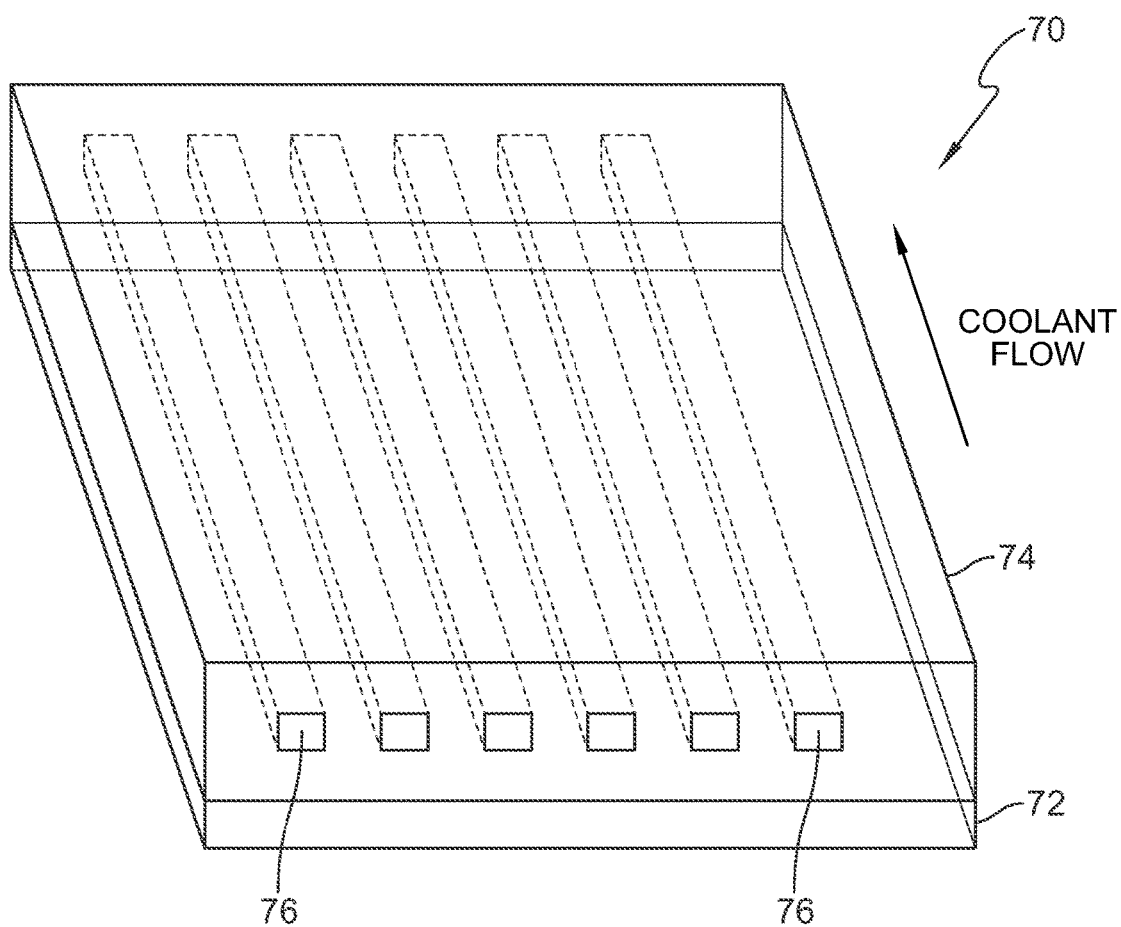
FIG. 8 is a perspective view of an illustrative thermal protection and cooling overlay according to the present disclosure for use with the assemblies of FIGS. 1A-7B.
Figure 9:
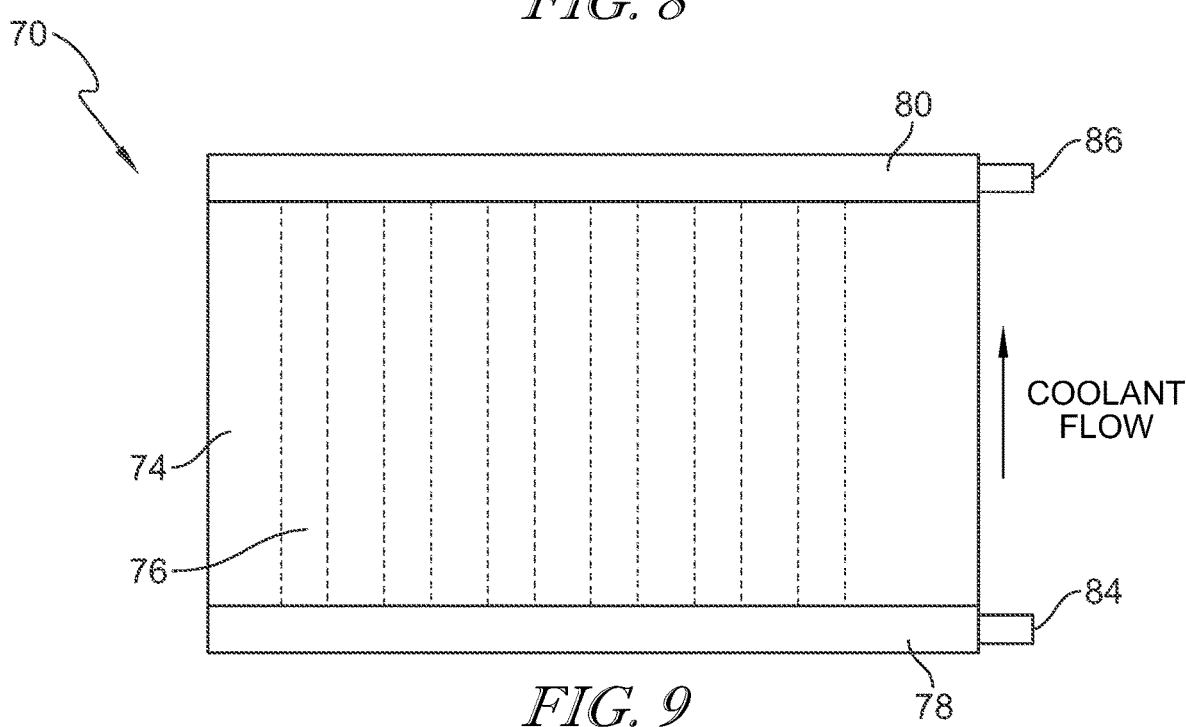
FIG. 9 is a partial top plan view of the overlay of FIG. 8.

FIGS. 8 and 9 show an illustrative embodiment of a thermal protection and cooling overlay 70 according to the present disclosure. The overlay 70 includes a skin 72 and a heat exchanger 74 coupled to the skin 72 in a manner that provides for good heat transfer between the skin 72 and the heat exchanger 74. In an embodiment, the heat exchanger 74 may be bonded to the skin 72. In an embodiment, the skin 72 may be made of a ceramic material, and the heat exchanger 74 may be made of a metal alloy suitable for use in high temperature environments and having good heat transfer properties.

As suggested above, and as shown in the drawings, the exposed surface of the skin 72 opposite the heat exchanger 74 may further define the first flow path 22, the second flow path 24, and the combined flow path. As such, the exposed surface of the skin 72 is configured to enable smooth flow of pressurized exhaust thereacross.

Figure 10:
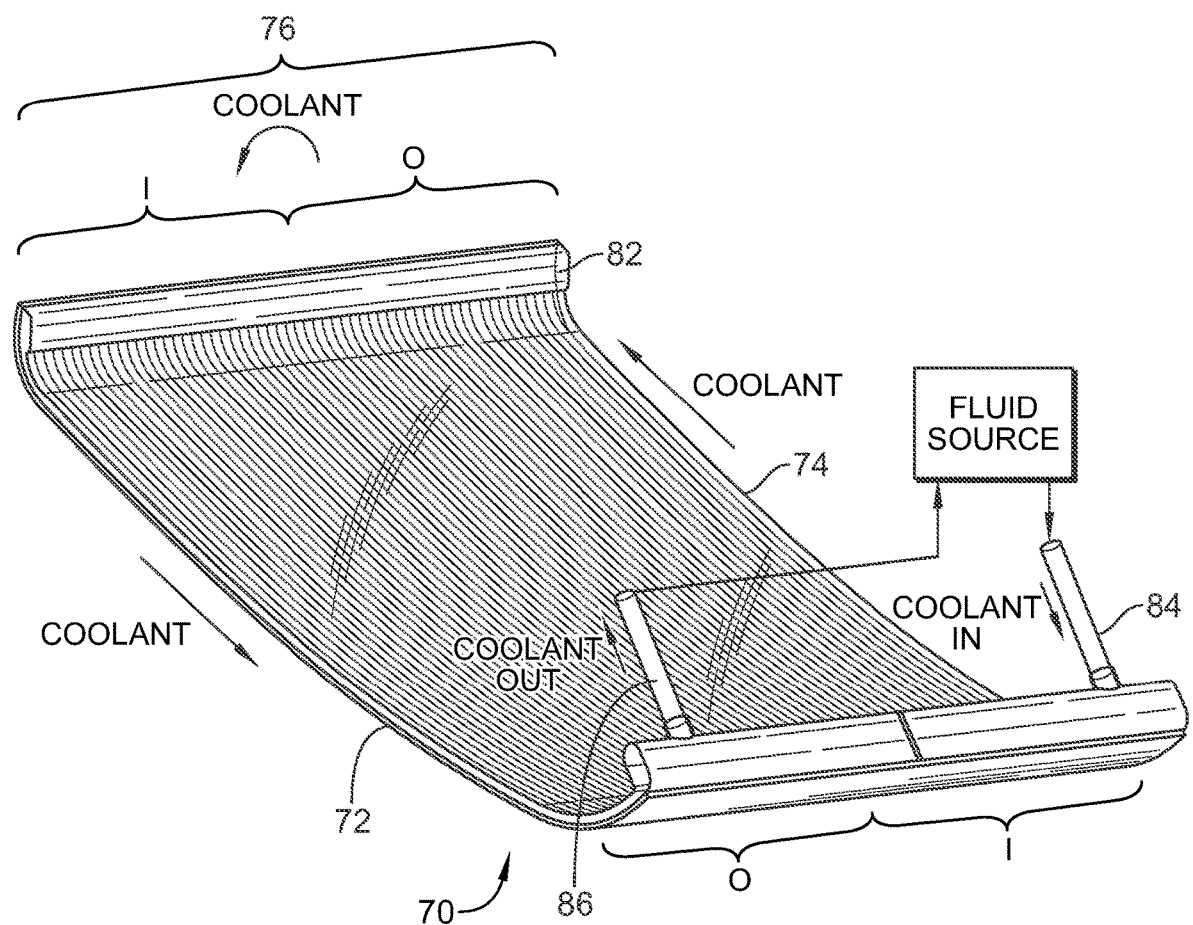
FIG. 10 is a perspective view of illustrative thermal protection and cooling overlay according to the present disclosure configured to be coupled to the door of the assembly of FIG. 1A.

The heat exchanger 74 defines a plurality of cooling channels 76 extending therethrough and configured to convey a liquid coolant therethrough as suggested in FIG. 10. Each of the cooling channels 76 has an inlet end I and an outlet end O. The inlet ends of plural ones of the cooling channels 76 may be in fluid communication with each other and with an inlet manifold 78. Similarly, the outlet ends of plural ones of the cooling channels 76 may be in fluid communication with each other and with an outlet manifold 80.

The inlet manifold 78 is configured to receive the liquid coolant from a source of liquid coolant associated with the assembly 10 and to supply the liquid coolant to the inlet ends of the cooling channels 76. Similarly, the outlet manifold 80 is configured to receive the liquid coolant from the outlet ends of the cooling channels 76 and to return the liquid coolant from a source of liquid coolant associated with the assembly 10.

The inlet manifold 78 may receive the liquid coolant from the source of liquid coolant by any suitable conduit, for example, any suitable line, hose, or tube extending from the inlet manifold 78 to the source of liquid coolant. Similarly, outlet manifold 80 may return the liquid coolant to the liquid coolant receiver by any suitable conduit, for example, any suitable line, hose, or tube extending from the outlet manifold 80 to the liquid coolant receiver.

In some embodiments, the outlet ends of ones of the cooling channels 76 may be in fluid communication with each other and with the inlet ends of other ones of the cooling channels 76 through an intervening return manifold 82. For example, with reference to FIG. 10, which shows an overlay 70 configured for coupling to the door 26, the heat exchanger 74 may be configured so that a first plurality of cooling channels 76 receives liquid coolant at inlet ends I thereof through the inlet manifold 78, so that the first plurality of cooling channels 76 discharges liquid coolant at outlet ends O thereof to the return manifold 82, so that a second plurality of cooling channels 76 receives liquid coolant at inlet ends I thereof through the return manifold 82, and so that the second plurality of cooling channels 76 discharges liquid coolant at outlet ends O thereof to the outlet manifold 80. FIGS. 9 and 10 also shows an inlet pipe 84 configured to convey liquid coolant from the source of liquid coolant to the inlet manifold 78, and an outlet pipe 86 configured to convey liquid coolant from the outlet manifold 80 to the liquid coolant receiver.

Figure 11:
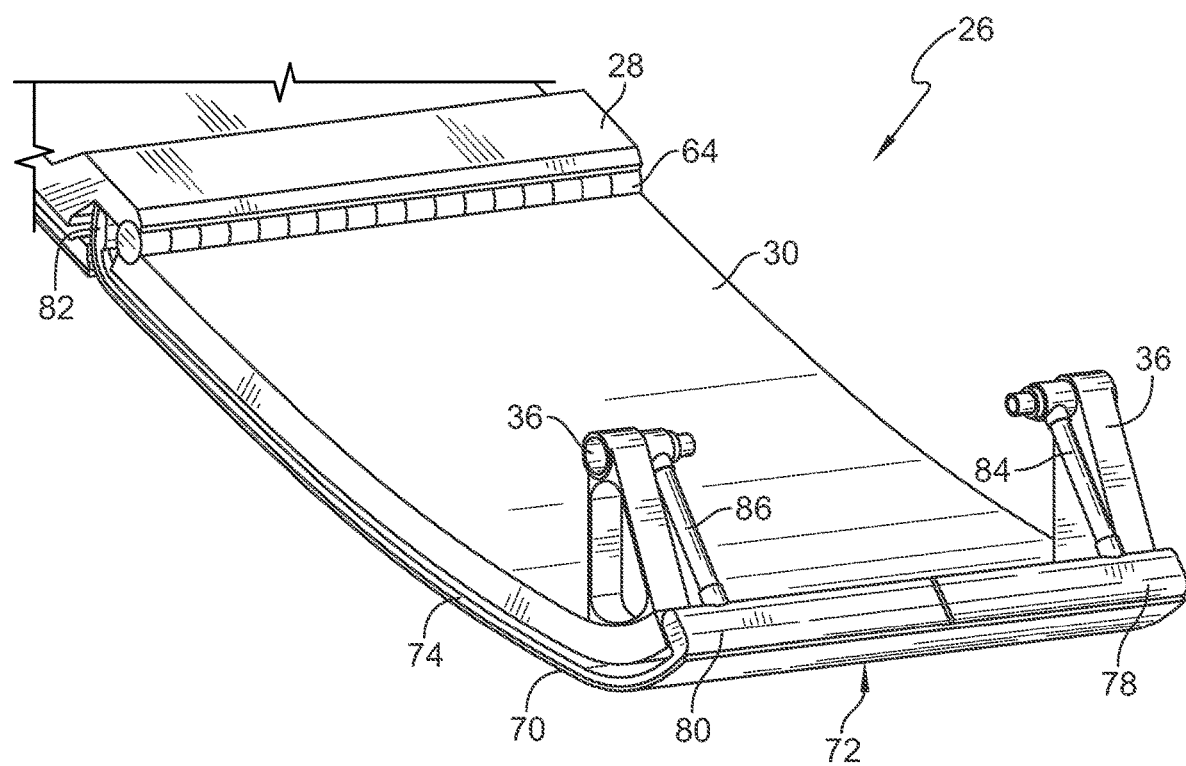
FIG. 11 is a perspective view of the thermal protection and cooling overlay of FIG. 10 coupled to the door of the assembly of FIG. 1A.

As shown in FIG. 11, the liquid coolant may be provided to the inlet manifold 78 of the aft panel 30 of the door 26 through one of the pivots 36. Similarly, the liquid coolant may be returned from the outlet manifold 80 of the aft panel 30 of the door 26 to a liquid coolant receiver through another one of the pivots 36. More specifically, the aft panel 30 of the door 26 is pivotably coupled to the housing 12 by pivots 36. A first one of the pivots 36 may be provided with a first internal passage (not shown) configured to receive the liquid coolant from a corresponding liquid coolant supply associated with the housing 12 and convey the liquid coolant to the inlet manifold 78 via the inlet pipe 84. Similarly, a second one of the pivots 36 may be provided with a second internal passage (not shown) configured to receive the liquid coolant from the outlet manifold 80 via the outlet pipe 86 and convey the liquid coolant to a corresponding liquid coolant return associated with the housing 12.

In an embodiment (not shown), the cooling channels 76 of an overlay 70 coupled to the forward panel 28 of the door 26 are fluidly coupled to the cooling channels 76 of an overlay 70 coupled to the aft panel 30 of the door 26 via fluid passages internal to a pivot mechanism 64 coupling the forward panel 28 of the door 26 to the aft panel 30 of the door 26.

Figure 12:
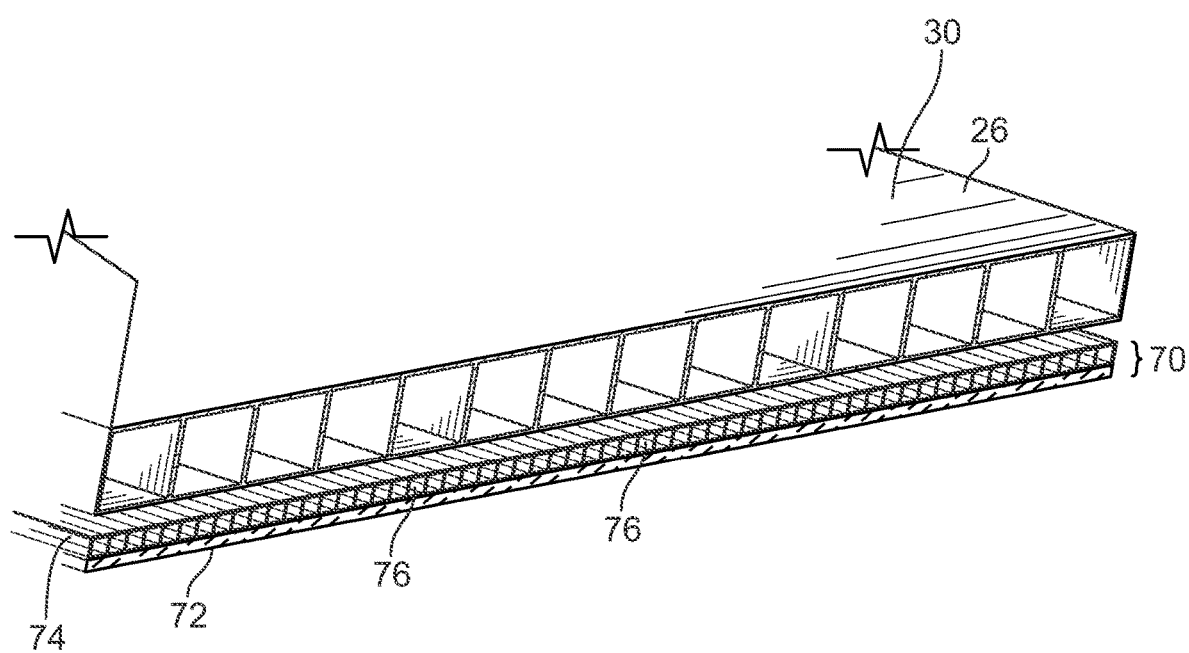
FIG. 12 is a cross-sectional perspective view of the thermal protection and cooling overlay and door of FIG. 11.
Figure 13:
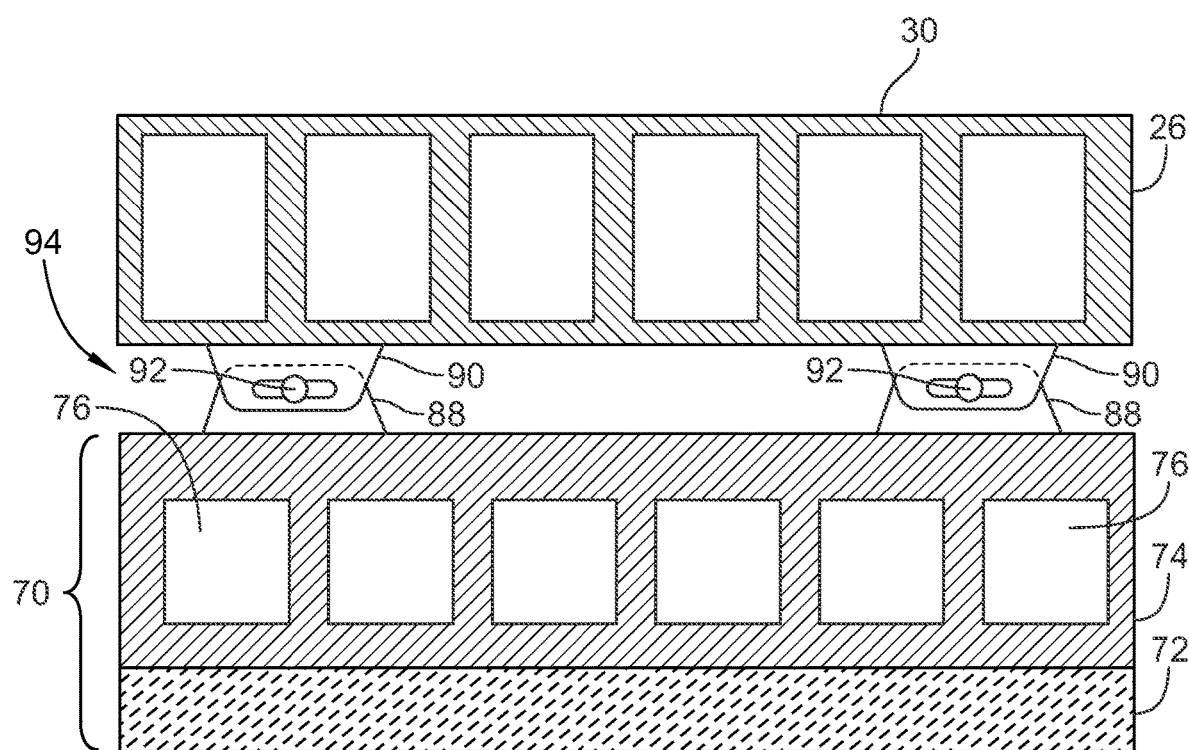
FIG. 13 is a cross-sectional end view of the thermal protection and cooling overlay and door of FIG. 11.

As best shown in FIGS. 12 and 13, the overlay may be coupled to the door 26 or to a wall defining the first exhaust duct 14, the second exhaust duct 16, or the combined outlet 20 in a manner that allows differential thermal growth of the overlay 70 and the door 26 or wall with which the overlay 70 may be coupled. That is, it is mechanically attached and thermally compliant. For example, as shown in FIG. 13, both the overlay 70 and the door 26 or wall may be provided with complementary mounting flanges 88, 90, each defining a slot through which a pin 92 or other fastener may be received, thereby securing the overlay 70 to the door 26 or wall in a manner that allows side-to-side and end-to-end thermal growth of the overlay 70 with respect to the door 26 or other wall. A gap 94 is defined between the overlay 70 and the panel 30 in the illustrative embodiment.

Figure 14:
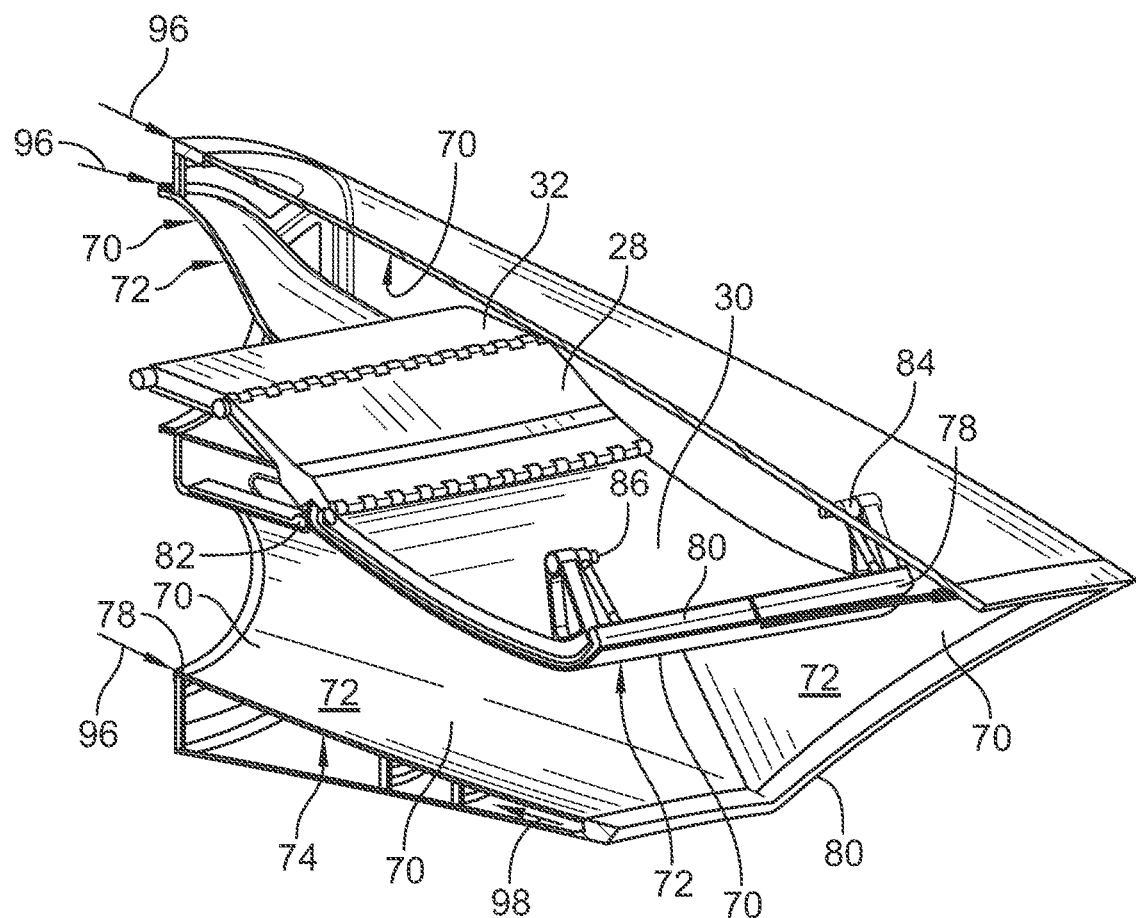
FIG. 14 is a cut-away perspective view of the assembly of FIG. 1A with thermal protection and cooling overlays as shown in FIGS. 8 and 9 coupled to interior wall surfaces thereof.

As shown in FIG. 14, one or more overlays 70 may be coupled to any or all of the inner walls 43 of the first exhaust duct 14, the second exhaust duct 16, the combined outlet 20, and the surface of the door 26 facing away from the cavity 40. The overlay(s) 70 are coupled directly to the wall 43 in the illustrative embodiment. As such the heat exchanger layer 74 is in direct contact with the inner wall 43. In other embodiments, an air gap is formed between the overlay(s) 70 and the inner wall 43.

In some embodiments, the overlays 70 are coupled to any or all of the first exhaust duct 14, the second exhaust duct 16, the combined outlet 20, and the door 26 so that the liquid coolant flows through the cooling channels predominantly in a fore and aft direction. In other embodiments, the overlays may be coupled to any or all of the first exhaust duct 14, the second exhaust duct 16, the combined outlet 20, and the door 26 so that the liquid coolant flows through the cooling channels predominantly in other directions. Heat from the exhaust flows heats the overlays 70 and the fuel flowing in the overlays carry the rejected heat away to cool the housing 12 and door 26.

In the illustrative embodiment, fuel is conducted from an axially forward end of the housing 12 through the overlays 70 to an aft end of the housing 12 as shown in FIG. 14. The fuel inlet is indicated by arrows 96. The fuel now having heat rejected therein may be collected at the aft end at the exit of the housing 12 and directed internally or externally of the housing 12 to the fuel source. The fuel outlet is indicated by arrow 98. In other embodiments, the fuel is conducted aft to forward or circumferentially around the housing 12.

The liquid coolant may be fuel carried by an aircraft in which the assembly 10 may be installed and for combustion in an engine of the aircraft. The source of liquid coolant may be a fuel tank of the aircraft containing such fuel. The liquid coolant receiver may be the fuel tank or another tank configured to receive the liquid coolant. In an embodiment, the liquid coolant receiver may be an engine of the aircraft, for example, one of the turbofan engine GTE 110 and the ramjet engine RE 210. The fuel may be used due to the few options available for cooling sinks at high speeds (for example greater than Mach 0.8 and/or high altitudes). In other embodiments, the coolant may be other fluids such as gases. In one example, the coolant is air from the compressor 112. Such air coolant may be used with engines and systems configured to subsonic travel.

Although the overlay 70 has been described for use in a dual flow path exhaust assembly including a turbofan engine exhaust duct, a ramjet engine exhaust duct, and a combined outlet, the overlay 70 could be uses in other aircraft engine applications.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A cooling system for use in a dual flow path exhaust assembly for a combined turbofan and ramjet engine including a turbofan engine configured to provide a first stream of pressurized exhaust and a ramjet engine configured to provide a second stream of pressurized exhaust, the cooling system comprising:

a housing that includes a turbofan engine exhaust duct defining a first flow path configured to convey the first stream of pressurized exhaust therethrough, a ramjet engine exhaust duct defining a second flow path configured to convey the second stream of pressurized exhaust therethrough, and a combined outlet defining a combined flow path, the combined outlet defined by a confluence of an aft end of the turbine engine exhaust duct and an aft end of the ramjet engine exhaust duct, the combined outlet in fluid communication with the ramjet engine exhaust duct and in selective fluid communication with the turbofan engine exhaust duct and configured to receive the second stream of pressurized exhaust therethrough and to selectively receive and convey the first stream of pressurized exhaust therethrough;

a door configured to selectively block the turbofan engine exhaust duct from the ramjet engine exhaust duct and the combined outlet; and an overlay coupled to at least one of an inner surface of one of the turbofan engine exhaust duct, the ramjet engine exhaust duct, the combined outlet, and the door, the overlay comprising:
- a skin configured to further define a corresponding one of the first flow path, the second flow path, and the combined flow path, the skin further configured to enable smooth flow of the corresponding one of the first stream of pressurized exhaust and the second stream of pressurized exhaust thereacross; and
- a heat exchanger coupled to the skin, the heat exchanger comprising a plurality of cooling channels extending therethrough, each of the plurality of cooling channels configured to receive a liquid coolant at an inlet end thereof from a source of liquid coolant and to return the liquid coolant from an outlet end thereof to a liquid coolant receiver.

2. The cooling system of claim 1, further comprising the source of liquid coolant, the liquid coolant receiver, a first conduit coupling the source of liquid coolant to the inlet ends of the cooling channels, and a second conduit coupling the outlet ends of the cooling channels to the liquid coolant receiver.

3. The cooling system of claim 2, wherein the source of liquid coolant is a fuel tank of an aircraft in which the cooling system is installed.

4. The cooling system of claim 3, wherein the liquid coolant is fuel for combustion in one of the turbofan engine and the ramjet engine.

5. The cooling system of claim 1, further comprising a second overlay as recited in claim 1, the second overlay coupled to an inner surface of a second one of the turbofan engine exhaust duct, the ramjet engine exhaust duct, the combined outlet, and the door.

6. The cooling system of claim 3, wherein the overlay is coupled to the door, wherein the door is pivotably coupled to the housing by a pivot, and wherein the pivot comprises an internal fluid passage configured to convey the liquid coolant therethrough.

7. The cooling system of claim 1, wherein the overlay is coupled to the one of the turbofan engine exhaust duct, the ramjet engine exhaust duct, the combined outlet, and the door in a manner that allows differential thermal growth of the overlay and the one of the turbofan engine exhaust duct, the ramjet engine exhaust duct, the combined outlet, and the door.

8. The cooling system of claim 1, wherein the overlay is pinned to the one of the turbofan engine exhaust duct, the ramjet engine exhaust duct, the combined outlet, and the door in a manner that allows differential thermal growth of the overlay and the one of the turbofan engine exhaust duct, the ramjet engine exhaust duct, the combined outlet, and the door.

9. The cooling system of claim 1, wherein the skin is made of a ceramic material and the heat exchanger is made of a metal material.

10. A cooling system for use in a dual flow path exhaust assembly for a combined turbofan and ramjet engine including a turbofan engine configured to provide a first stream of pressurized exhaust and a ramjet engine configured to provide a second stream of pressurized exhaust, the cooling system comprising:
- a housing including a first exhaust duct configured to convey the first stream of pressurized exhaust therethrough, a second exhaust duct configured to convey the second stream of pressurized exhaust therethrough, and a combined outlet configured to convey a combined stream of pressurized exhaust therethrough, the combined stream of pressurized exhaust comprising the first stream of pressurized exhaust and the second stream of pressurized exhaust;
- a door configured to selectively block the first exhaust duct from the second exhaust duct and the combined outlet; and
- an overlay coupled to an inner surface of one of the first exhaust duct, the second exhaust duct, the combined outlet, and the door, the overlay comprising:
  - a skin defining a corresponding one of a first flow path conveying the first stream of pressurized exhaust, a second flow path conveying the second stream of pressurized exhaust, and a combined flow path conveying the first stream of pressurized exhaust and the second stream of pressurized exhaust; and
  - a heat exchanger coupled to the skin, the heat exchanger comprising a plurality of cooling channels extending therethrough, each of the plurality of cooling channels configured to receive a liquid coolant at an inlet end thereof from a source of liquid coolant and to return the liquid coolant from an outlet end thereof to a liquid coolant receiver.

11. The cooling system of claim 10, further comprising further comprising the source of liquid coolant, the liquid coolant receiver, a first conduit coupling the source of liquid coolant to the inlet ends of the cooling channels, and a second conduit coupling the outlet ends of the cooling channels to the liquid coolant receiver.

12. The cooling system of claim 11, wherein the source of liquid coolant is a fuel tank of an aircraft in which the cooling system is installed.

13. The cooling system of claim 12, wherein the liquid coolant is fuel for combustion in one of the turbofan engine and the ramjet engine.

14. The cooling system of claim 10, further comprising a second overlay as recited in claim 10, the second overlay coupled to an inner surface of a second one of the first exhaust duct, the second exhaust duct, the combined outlet, and the door.

15. The cooling system of claim 13, wherein the overlay is coupled to the door, wherein the door is pivotably coupled to the housing by a pivot, and wherein the pivot comprises an internal fluid passage configured to convey the liquid coolant therethrough.

16. The cooling system of claim 10, wherein the overlay is coupled to the one of the first exhaust duct, the second exhaust duct, the combined outlet, and the door in a manner that allows differential thermal growth of the overlay with respect to the one of the first exhaust duct, the second exhaust duct, the combined outlet, and the door.

17. The cooling system of claim 10, wherein the overlay is pinned to the one of the turbofan engine exhaust duct, the ramjet engine exhaust duct, the combined outlet, and the door in a manner that allows differential thermal growth of the overlay with respect to the one of the turbofan engine exhaust duct, the ramjet engine exhaust duct, the combined outlet, and the door.

18. The cooling system of claim 10, wherein the skin is made of a ceramic material and the heat exchanger is made of a metal material.

19. A method for cooling a surface defining an exhaust duct of a combined turbofan engine and ramjet engine of an aircraft, the method comprising the steps of:
   providing a dual flow path exhaust assembly for an aircraft including a first exhaust duct, a second exhaust duct, a combined outlet, and a door configured to selectively block the first exhaust duct from the second exhaust duct and the combined outlet;
   providing an overlay comprising;
      a skin defining an inner surface of a corresponding one of the first exhaust duct, the second exhaust duct, the combined outlet, and the door; and
      a heat exchanger coupled to the skin, the heat exchanger comprising a plurality of cooling channels extending therethrough, each of the plurality of cooling channels configured to convey a liquid coolant therethrough,
   providing a source of liquid coolant; and
   conveying the liquid coolant through the plurality of cooling channels.

20. The method of claim 19, wherein the source of liquid coolant is a fuel tank and the liquid coolant is fuel for combustion in engine of the aircraft.

\* \* \* \* \*